(12) United States Patent
Kim et al.

(10) Patent No.: US 7,248,440 B2
(45) Date of Patent: Jul. 24, 2007

(54) SINGLE LEVER TYPE ACTUATOR LATCH SYSTEM OF DISK DRIVE

(75) Inventors: Tae-soo Kim, Suwon-si (KR); Woo-cheol Jeong, Anyng-si (KR); Do-wan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 408 days.

(21) Appl. No.: 10/929,766

(22) Filed: Aug. 31, 2004

(65) Prior Publication Data

US 2005/0174697 A1    Aug. 11, 2005

(30) Foreign Application Priority Data

Sep. 1, 2003    (KR) .................. 10-2003-0060745

(51) Int. Cl.
*G11B 21/22*    (2006.01)
*G11B 5/54*    (2006.01)

(52) U.S. Cl. .............. 360/256.2; 360/256.3; 360/256.5; 360/256.6; 360/256.4

(58) Field of Classification Search .......... 360/256, 360/256.2–256.5
See application file for complete search history.

(56) References Cited

U.S. PATENT DOCUMENTS

| | | | | |
|---|---|---|---|---|
| 5,034,837 A | * | 7/1991 | Schmitz | 360/256.2 |
| 5,187,627 A | * | 2/1993 | Hickox et al. | 360/256.2 |
| 5,233,493 A | * | 8/1993 | Eliason | 360/264.9 |
| 5,305,169 A | * | 4/1994 | Anderson et al. | 360/256.2 |
| 5,363,261 A | | 11/1994 | Eckberg et al. | |
| 5,369,538 A | * | 11/1994 | Moe et al. | 360/265.1 |
| 5,566,375 A | * | 10/1996 | Isomura | 360/256.2 |
| 5,570,250 A | * | 10/1996 | Casey | 360/265.7 |
| 5,581,424 A | * | 12/1996 | Dunfield et al. | 360/256.2 |
| 5,659,215 A | * | 8/1997 | Dunfield et al. | 310/154.21 |
| 5,734,527 A | * | 3/1998 | Reinhart | 360/256.2 |
| 5,742,455 A | * | 4/1998 | Boutaghou | 360/256.5 |
| 5,768,058 A | * | 6/1998 | Hofland | 360/256.1 |
| 5,801,907 A | * | 9/1998 | Yagi et al. | 360/256.2 |
| 6,108,173 A | * | 8/2000 | Iwabuchi | 360/256.2 |

(Continued)

FOREIGN PATENT DOCUMENTS

EP    0 576 839 A2    1/1994

(Continued)

*Primary Examiner*—Andrea Wellington
*Assistant Examiner*—Christopher R. Magee
(74) *Attorney, Agent, or Firm*—Staas & Halsey LLP

(57) ABSTRACT

An actuator latch system of a disk drive to lock an actuator having a swing arm installed at a base member, a voice coil motor coil joined to an end portion of the swing arm, and a magnet facing the voice coil motor coil, including a first and a second latch portion provided at the end portion of the swing arm; a latch lever provided at the base member, the latch lever having a first end portion engaged with the first latch portion when the latch lever pivots a first direction, and a second end portion engaged with the second latch portion when the latch lever pivots a second direction; a projection projecting from an edge of the magnet; and a magnetic latch pin provided at an end portion of the swing arm so that a magnetic force operates between the latch pin and the projection.

43 Claims, 7 Drawing Sheets

U.S. PATENT DOCUMENTS

| | | |
|---|---|---|
| 6,252,744 B1 * | 6/2001 | Kelemen .................. 360/256.2 |
| 6,529,349 B1 | 3/2003 | Byun et al. |
| 6,822,835 B2 * | 11/2004 | Kim ........................ 360/256.2 |
| 7,050,269 B2 * | 5/2006 | Hong et al. ................. 360/256 |
| 2002/0149882 A1 | 10/2002 | Williams et al. |
| 2005/0063098 A1 * | 3/2005 | Matsumura et al. ..... 360/254.6 |

FOREIGN PATENT DOCUMENTS

EP        0 576 839 A3    1/1994

* cited by examiner

SINGLE LEVER TYPE ACTUATOR LATCH SYSTEM OF DISK DRIVE

CROSS-REFERENCE TO RELATED APPLICATION

This application claims the benefit of Korean Application No. 2003-60745, filed Sep. 1, 2003, in the Korean Intellectual Property Office, the disclosure of which is incorporated herein by reference.

BACKGROUND OF THE INVENTION

1. Field of the Invention

The present invention relates to a disk drive, and more particularly, to an actuator latch system of a disk drive capable of locking an actuator at a predetermined position when a disk stops rotating and, thereby, preventing the actuator from being rotated by an external shock.

2. Description of the Related Art

A hard disk drive is a data storage device for a computer that uses at least one read/write head to reproduce data stored in at least one disk and/or to record data onto the disk. In such a hard disk drive, the read/write head performs a reading/writing while being moved to a desired position by an actuator, wherein the read/write head is floated at a predetermined height from a recording surface of a rotating disk.

When the hard disk drive is not in an operating state, that is, when the disk stops rotating, the read/write head is parked at a position outside of the recording surface of the disk, such that the read/write head does not strike or contact the recording surface of the disk. Such head parking systems are classified broadly into a contact start stop (CSS) type and a ramp loading type.

In the CSS type system, a landing zone in which data is not recorded is provided at an inner circumferential region of the disk, and the read/write head contacts the landing zone and parks at the landing zone. In the ramp loading type system, a ramp is installed at a position outside the disk, and read/write head is parked on the ramp.

However, in both the CSS type system and the ramp-loading type system, the actuator may arbitrarily rotate due to an external shock or vibration applied to the disk drive, thereby causing the head to be freed from the landing zone or the ramp, and contact the recording surface of the disk. When the head contacts the recording surface of the disk, the head and/or the recording surface of the disk may be damaged. Therefore, when the disk stops rotating, and the head is parked at the landing zone or on the ramp, it is necessary to lock the actuator at a predetermined position so that the actuator may not rotate arbitrarily. To this end, the disk drive is provided with various types of actuator latch systems.

A magnetic latch system is generally used in the CSS type system. The magnetic latch system locks the actuator at a desired position, that is, a parking position using a magnetic force of a permanent magnet. A strong magnetic force is required to provide a strong latch force for a stable latch locking of the actuator.

However, in order to operate the disk drive, the head moves to the recording surface of the disk, and, to this end, the locking of the actuator must be released. At this time, since the stronger the latch force is, the greater the torque applied to the actuator is, the actuator trembles while rotating due to the inertia thereof upon releasing the actuator from the locking state. In order to prevent this, although a brake is applied to the rotation of the actuator simultaneously upon releasing the actuator from the locking state, precise controlling of the actuator is very difficult. Therefore, with a conventional magnet latch system, the latch force of the magnet latch system is limited and, accordingly, the magnet latch system cannot properly withstand a strong external shock.

In order to solve the above discussed problem of the conventional magnet latch system, an inertial latch system using an inertial lever has been proposed. A conventional single lever type inertial latch system is shown in FIGS. 1 through 3.

Referring to FIG. 1, an actuator 10 that moves a read/write head for reproducing and/or recording data to a desired position on a disk is installed at a disk drive. The actuator 10 has a swing arm 12 joined to a pivot bearing to be able to rotate, and a suspension 13 installed at one end portion of the swing arm 12 to support a slider 14 mounted with the read/write head and to elastically bias the slider 14 toward the surface of the disk.

In addition, an inertial latch system 20 that locks the actuator 10 when the head is parked on a ramp 15 is provided at the disk drive. The inertial latch system 20 is comprised of a latch lever 21 pivoting due to the inertia thereof, a latch hook 22 provided at the leading end of the latch lever 21, a notch 23 provided at the swing arm 12 of the actuator 10, a crash stop 24 for limiting the clockwise rotation of the swing arm 12, and a latch stop 25 for limiting the clockwise rotation of the latch lever 21.

In the above conventional inertial latch system 20, when a clockwise rotational shock is applied to the disk drive, the swing arm 12 of the actuator 10 and the latch lever 21 pivot counterclockwise due to the inertia thereof, as shown in FIG. 2. Accordingly, the latch hook 22 is caught by the notch 23, and the swing arm 12 of the actuator 10 can pivot no more counterclockwise. To the contrary, when a counterclockwise rotational shock is applied to the disk drive, the swing arm 12 of the actuator 10 and the latch lever 21 pivot clockwise due to the inertia thereof as shown in FIG. 3. At this time, the swing arm 12 collides with the crash stop 24 while pivoting clockwise first, and rebounds from the crash stop 24 to pivot counterclockwise, and the latch lever 21 collides with the latch stop 25, and rebounds from the latch stop 25 to pivot counterclockwise too. Accordingly, the latch hook 22 engages with the notch 23 for the inertial latch system 20 to lock the actuator 10.

The conventional single lever type inertial latch system 20 having the above-described structure properly functions when a clockwise rotational shock is applied to the disk drive, and the swing arm 12 of the actuator 10 pivots counterclockwise. However, when a counterclockwise rotational shock is applied to the disk drive, the swing arm 12 and the latch lever 21 all rebound from the crash stop 24 and the latch stop 25, and the latch hook 22 and the notch 23 engage with each other. Therefore, when the rebounding of the swing arm 12 does not exactly coincide with the rebounding of the latch lever 21, the notch 23 provided at the swing arm 12 does not engage with the latch hook 22, and, therefore, the actuator 10 does not lock. Thus, with the conventional single lever type inertial latch system 20, it is difficult to securely lock the actuator 10 when a counter clockwise rotational shock is applied to the disk drive.

FIGS. 4 through 6 show a dual lever type inertial latch system intended to correct the above drawback of the conventional single latch lever system.

First, referring to FIG. 4, an inertial latch lever system for locking an actuator 30 is comprised of first and second latch levers 41 and 42 pivoting due to the inertia thereof, a latch pin 43 provided at the first latch lever 41, a latch hook 44 provided at the second latch lever 42, a notch 45 provided at a swing arm 32 of the actuator 30, and a crash stop 46 for limiting the clockwise rotation of the swing arm 32.

In the conventional dual lever type inertial latch system 40, when a clockwise rotational shock is applied to the disk drive, the swing arm 32 of the actuator 30 and the first and second latch levers 41 and 42 pivot counterclockwise due to the inertia thereof as shown in FIG. 5, accordingly the latch hook 44 is caught by the notch 45, and the swing arm 32 of the actuator 30 can pivot no more counterclockwise. To the contrary, when a counterclockwise rotational shock is applied to the disk drive, the swing arm 32 of the actuator 30 and the first latch lever 41 pivot clockwise due to the inertia thereof as shown in FIG. 6. At this time, the swing arm 32 collides with the crash stop 46 while pivoting clockwise first, and rebounds from the crash stop 46 to pivot counterclockwise. In addition, as the first latch lever 41 pivots clockwise, the latch pin 43 pushes the second latch lever 42 to pivot counterclockwise. Accordingly, the latch hook 44 of the second latch lever 42 hooks the notch 45, and, therefore, limits counterclockwise pivoting of the swing arm 32.

The conventional dual lever type inertial latch system 40 having the above-described structure functions stably for both clockwise and counterclockwise rotational shocks applied to the disk drive. However, since the inertial latch system 40 requires two latch lever 41 and 42, the structure thereof is complicated, the size thereof becomes greater, and, therefore, the inertial latch system 40 takes up greater space. Therefore, the manufacturing cost increases, the assembling operation requires more time, and it is difficult to apply the inertial latch system 40 to a compact mobile disk drive.

Further, since the above-mentioned conventional inertial latch systems 20 and 40 are designed for use with only a relatively strong rotational shock enough to cause the latch lever or the latch levers to pivot, it is difficult to reliably secure the inertial latch system against a weak shock or weak vibration.

SUMMARY OF THE INVENTION

To solve the above-described and/or other problems, it is an aspect of the invention to provide an actuator latch system of a disk drive having a simple structure and capable of reliably functioning against not only a strong rotational shock but also a relatively weaker rotational shock or weaker vibration by employing a latch lever functioning due to the inertia thereof and a latching unit functioning due to a magnetic force.

Accordingly, to achieve the above aspect, there is provided an actuator latch system of a disk drive for locking an actuator having a swing arm installed at a base member to be able to rotate, a VCM (voice coil motor) coil joined to one end portion of the swing arm, and a magnet disposed to face the VCM coil comprising: a first latch portion and a second latch portion provided at an end portion of the swing arm; a latch lever installed at the base member and having a first end portion to be engaged with the first latch portion when the latch lever pivots counterclockwise, and a second end portion to be engaged with the second latch portion when the latch lever pivots clockwise; a projection formed to project from an edge of the magnet; and a latch pin provided at an end portion of the swing arm and made of a magnetic material so that a magnetic force can acts between the latch pin and the projection of the magnet.

Here, the first latch portion and the second latch portion are spaced a predetermined distance from each other, and formed to horizontally project from the end portion of the swing arm, respectively. In addition, the actuator latch system according to the present invention further comprises a crash stop for limiting clockwise rotation of the swing arm. Further, in a state in which the actuator is parked at a parking position, the latch pin is positioned at a position the closest to the projection, and, in this case, the latch pin is installed at the upper surface of the first latch portion.

Further, the projection is formed to have a semicircle shape.

The latch lever may be made of a nonmagnetic material, for example, a plastic injection molded product, and the first end portion of the latch lever is formed to have a hook shape.

Further, a lever pin made of a magnetic material is provided at the latch lever, and, in this case, the first end portion and the second end portion of the latch lever can be maintained in a state in which the first end portion and the second end portion are not engaged with the first latch portion and the second latch portion due to the magnetic force acting between the lever pin and the projection.

The lever pin may be made of steel, and the lever pin is installed at a position that is the closest to the projection in the vicinity of the pivoting center of the latch lever.

In addition, in a state in which the actuator is parked at a parking position, the projection, the latch pin, and the lever pin are arranged in a straight line.

In addition, the actuator latch system according to the present invention may further comprise a latch stop for limiting clockwise pivoting of the latch lever.

Further, the latch stop is formed to project from a side surface of the latch lever in the vicinity of the pivoting center of the latch lever, and comes in contact with a side wall of the base member when the latch lever pivots by a predetermined angle.

With the above structure, since the actuator latch system has a simple structure as compared with a conventional latch system, and, can reliably function when both clockwise and counterclockwise strong rotational shocks are applied to the disk drive and when relatively weak rotational shock and vibration are applied to the disk drive, stable locking of the actuator can be secured, the manufacturing cost thereof can be reduced, and the actuator latch system can be applied to a compact mobile disk drive easily.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
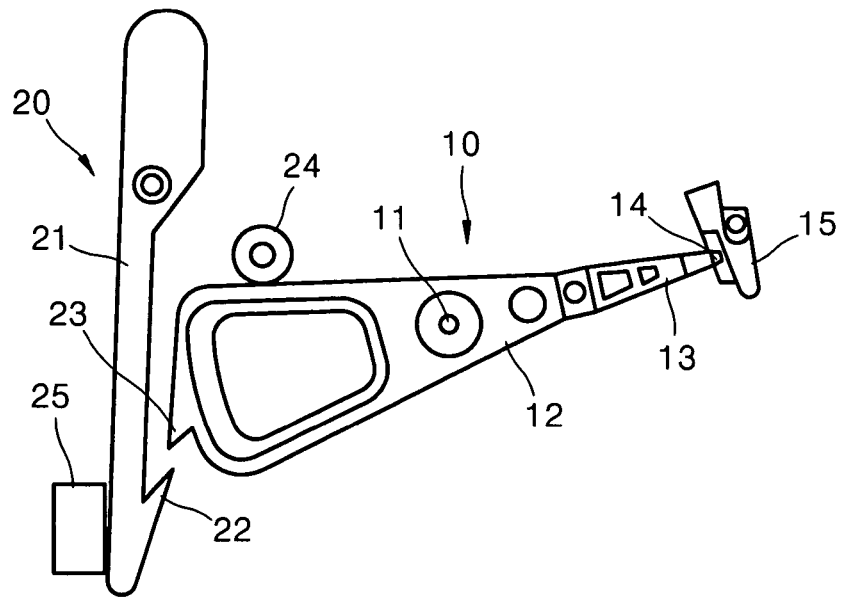
FIGS. 1 through 3 are diagrams of a conventional single lever type inertial latch system of a disk drive.
Figure 2:
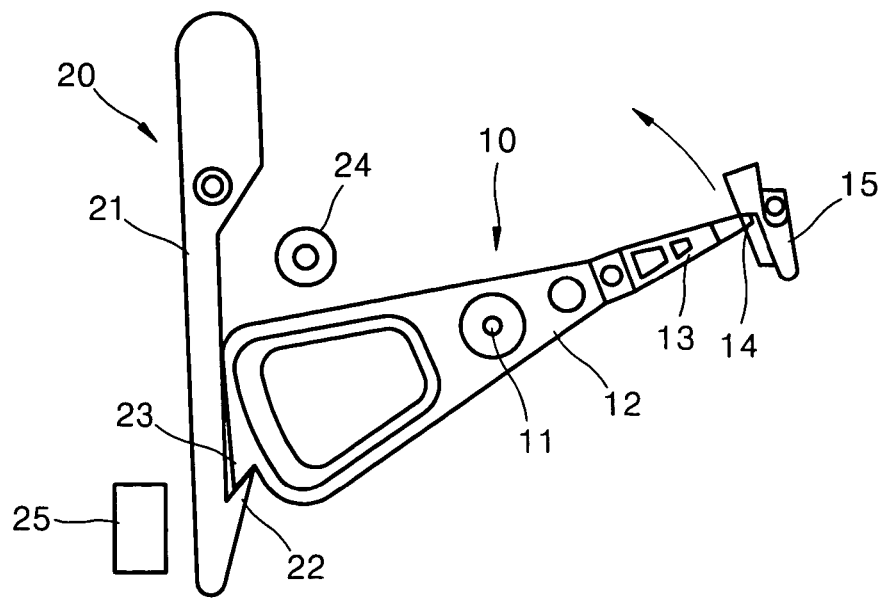
Figure 3:
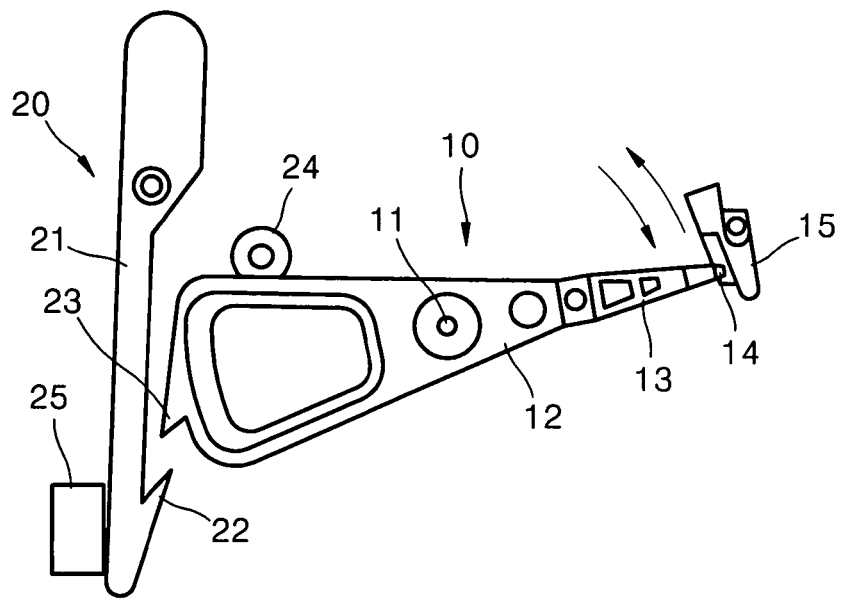
Figure 4:
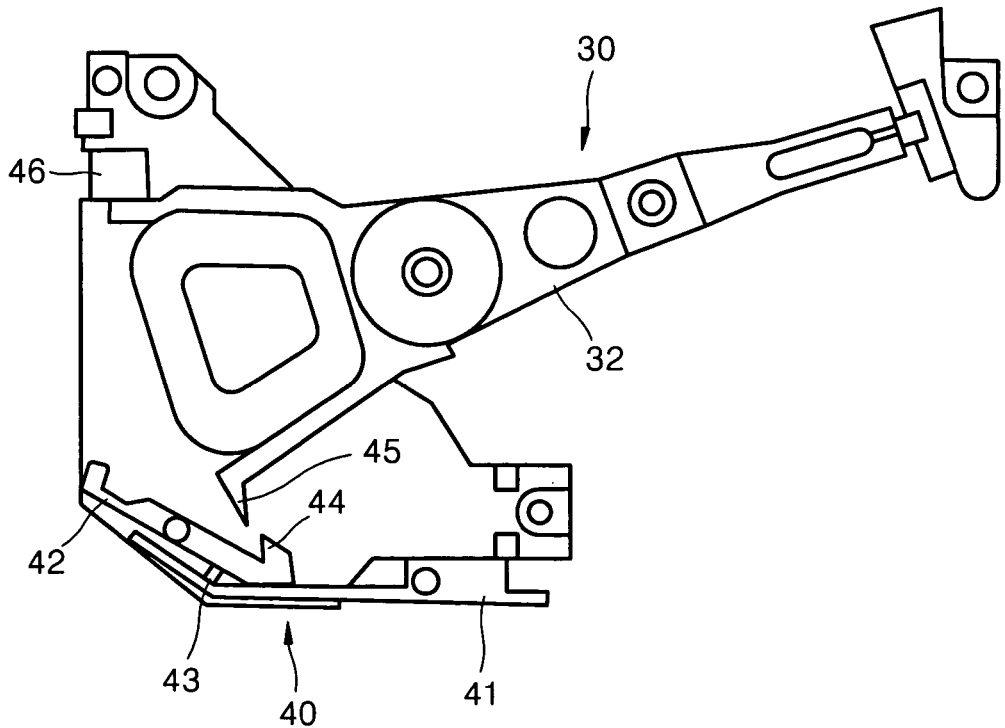
FIGS. 4 through 6 are diagrams of a conventional dual lever type inertial latch system of a disk drive.
Figure 5:
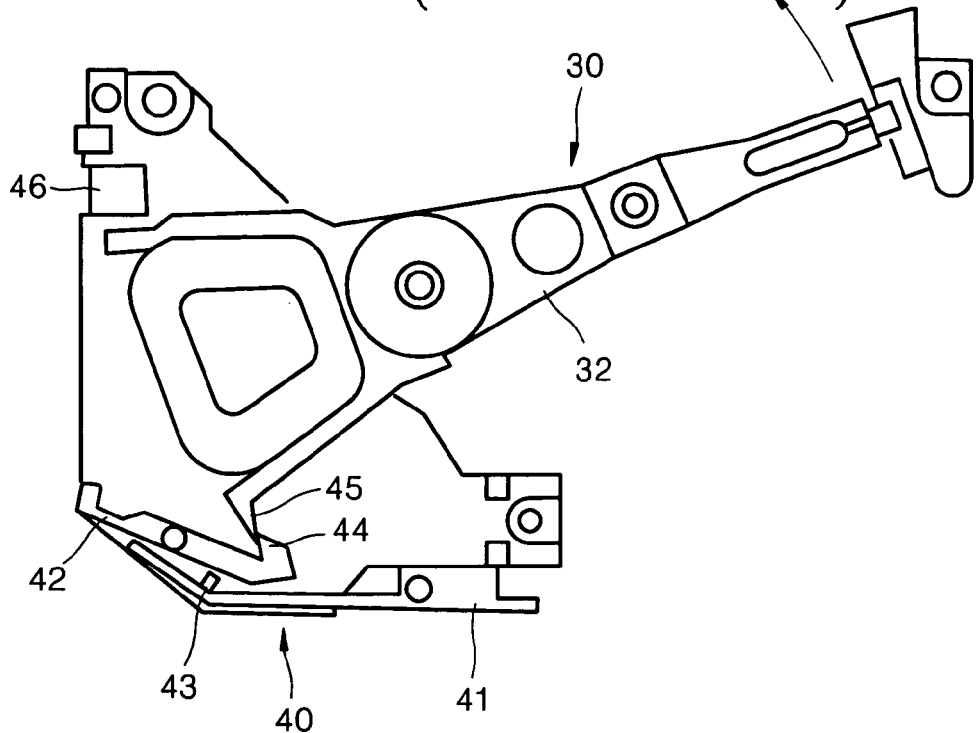
Figure 6:
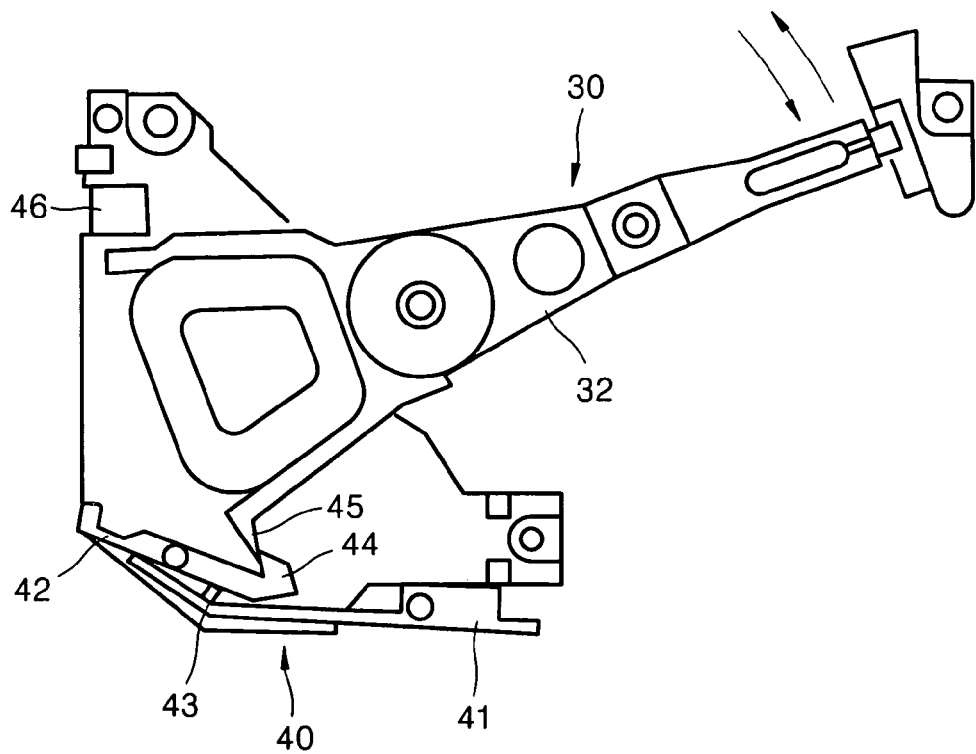

Reference will now be made in detail to the embodiments of the present invention, examples of which are illustrated in the accompanying drawings, wherein like reference numerals refer to the like elements throughout. The embodiments are described below to explain the present invention by referring to the figures.

A preferred embodiment of an actuator latch system of a disk drive according to the present invention will be described in detail with reference to the attached drawings. In the following drawings, the same reference numerals denote similar members of the previous drawings.

Figure 7:
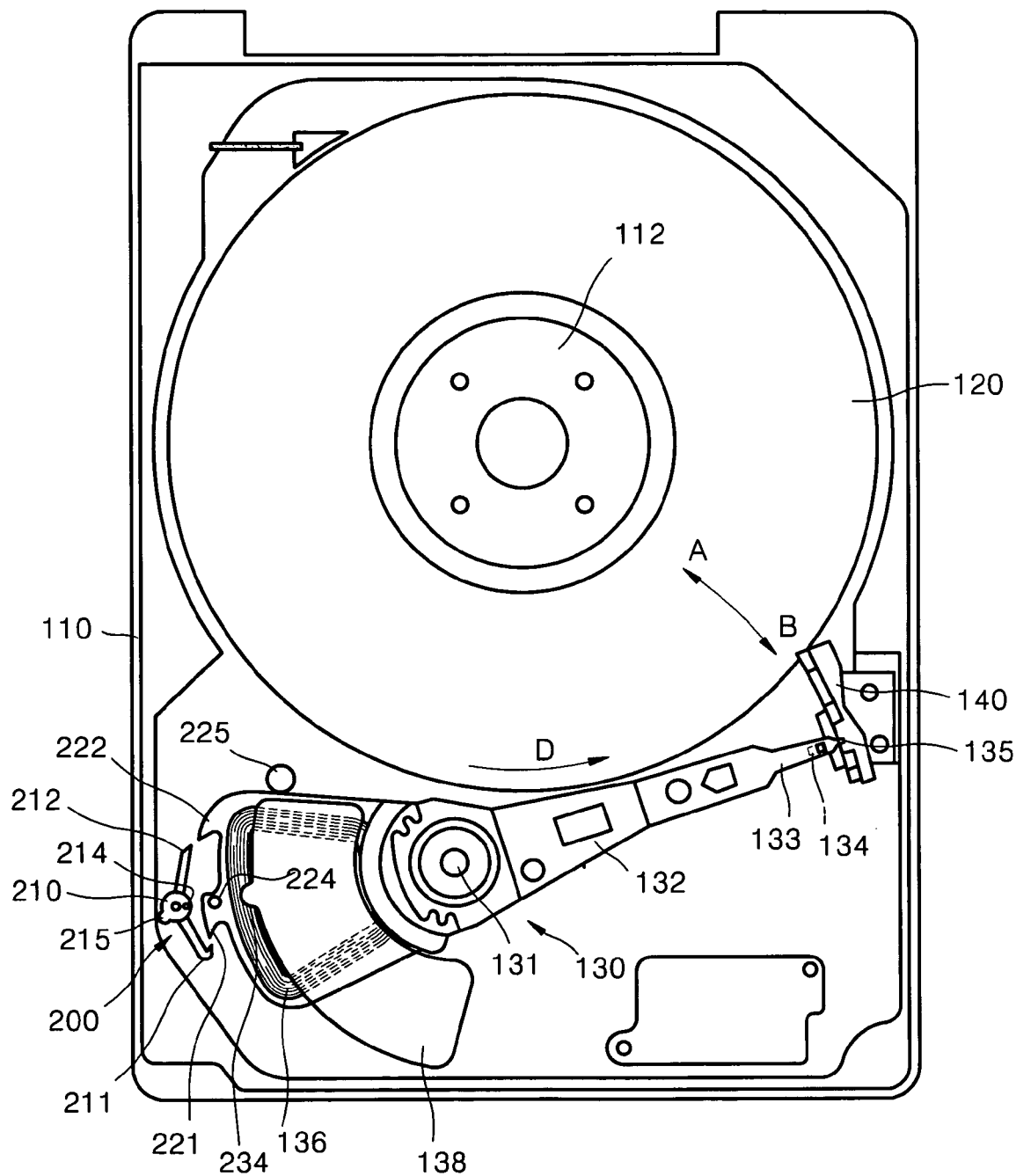
FIG. 7 is a plan view illustrating a disk drive employing an actuator latch system according to an embodiment of the invention.
Figure 8:
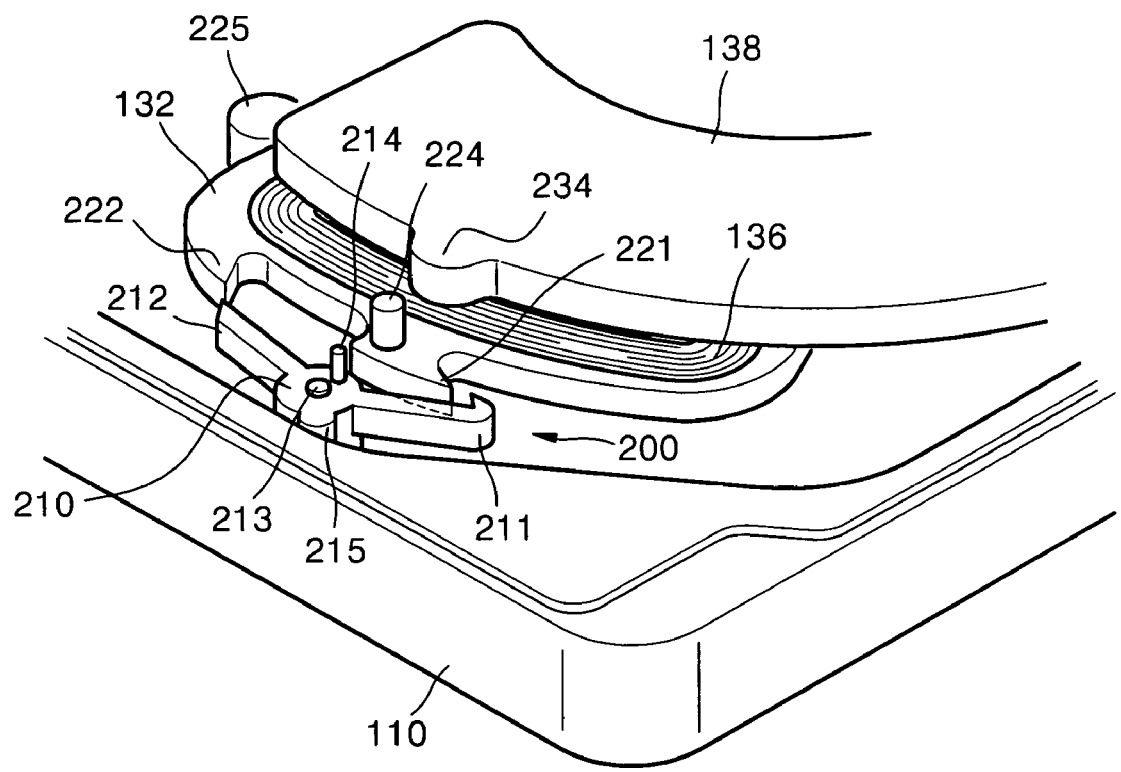
FIG. 8 is a perspective view illustrating the actuator latch system of FIG. 7.

FIG. 7 is a plan view of a disk drive employing an actuator latch system according to an aspect of the invention, and FIG. 8 is a perspective view of the actuator latch system of FIG. 7.

Referring to FIGS. 7 and 8, a disk drive is comprised of a disk 120 installed at a spindle motor 112, and an actuator 130 for moving a read/write head to record/reproduce data onto/from the disk 120 to a desired position on the disk 120. The actuator 130 is comprised of a swing arm 132 joined to a pivot bearing 131 installed at a base member 110 of the disk drive to be able to rotate, a suspension 133 installed at the leading edge of the swing arm 132 and supporting a slider 134 mounted with the head so as to be elastically biased toward a surface of the disk 120, and a voice coil motor (VCM) 136 for rotating the swing arm 132.

The voice coil motor is comprised of a VCM coil 136 joined to the rear end portion of the swing arm 132, and magnets 138 installed above and below the VCM coil 136, respectively, to face the VCM coil 136. Here, the magnet 138 may be installed only above or below the VCM coil 136. The voice coil motor having the above structure is controlled by a servo-control system, and rotates the swing arm 132 in a direction determined by Fleming's left-hand rule according to an interaction between a current inputted to the VCM coil and a magnetic field developed by the magnets 138. That is, when a power source of the disk drive is switched on, and the disk 120 begins to rotate, the voice coil motor rotates the swing arm 132 counterclockwise (in the direction of arrow A) to move the read/write head onto a recording surface of the disk 120. To the contrary, when the power source of the disk drive is switched off, and the disk 120 stops rotating, the voice coil motor rotates the swing arm 132 clockwise (in the direction of arrow B) to move the read/write head outside of the disk 120.

The read/write head moved outside the recording surface of the disk 120 is parked on a ramp 140 located at a position outside of the disk 120. When the disk 120 stops rotating, the swing arm 132 is rotated by the voice coil motor in the direction of arrow B, and, accordingly, an end-tap 135 formed at an end portion of the suspension 133 is parked on the ramp 140.

In addition, an actuator latch system 200 is provided in the disk drive. When the disk drive stops operating, that is, the disk stops rotating, the actuator latch system 200 serves to lock the actuator 130 so that the head installed at the actuator 130 can be maintained in a state of being parked on the ramp 140. That is, when the disk 120 stops rotating, the actuator latch system 200 prevents the head from being released from the ramp 140 and moving onto the disk 120 when the actuator 130 is rotated by an external shock or vibration. If the head is moved onto the disk 120 in the state that the disk 120 stops rotating, the head is directly in contact with the surface of the disk 120, and, accordingly, there is a dangerous possibility in which the surface of the disk 120 and the head may be damaged.

The actuator latch system 200 the includes both a single lever type inertial latch device and a magnetic latch device. The inertial latch device handles a relatively strong rotational shock, and the magnetic latch device handles a relatively weak rotational shock and a weak vibration.

The inertial latch device of the actuator latch system 200 includes a first latch portion 221 and a second latch portion 222, the latch portions 221 and 222 provided at the rear end portion of the swing arm 132, and a latch lever 210 installed at the base member 110, the latch member having a first end portion 211 and a second end portion 212.

The VCM coil 136 is joined with the rear end portion of the swing arm 132, as described above. The rear end portion of the swing arm 132 may be made of a plastic injection molded product; however, the rear end portion of the swing arm 13 is not limited to such a composition. The first latch portion 221 and the second latch portion 222 provided at the rear end portion of the swing arm 132 may be formed by plastic injection molding so as to project from the rear end portion of the swing arm 132, wherein the latch portions 221 and 222 preferably project horizontally from the rear end portion of the swing arm 13. In addition, the first latch portion 221 and the second latch portion 222 are disposed to be spaced a predetermined distance from each other. For example, the first latch portion 221 may be formed at an approximately middle portion or area of the rear end portion of the swing arm 132 and the second latch portion 222 may be formed at a side portion or area of the rear end portion of the swing arm 132.

The latch lever 210 is joined to a pivot shaft 213 installed at the base member 110 so that the latch member 210 is able to pivot. The latch lever 210 is preferably made of a nonmagnetic material. For example, the latch member may be made of a plastic injection molded product so as not to pivot arbitrarily due to magnetic forces of the magnets 138. The latch lever 210 pivots clockwise or counterclockwise due to the inertia thereof when a clockwise or counterclockwise rotational shock is applied to the disk drive, either internally or externally. When the latch lever 210 pivots counterclockwise, the first end portion 211 engages with the first latch portion 221 of the swing arm 132, and when the latch lever 210 pivots clockwise, the second end portion 212 engages with the second latch portion 222 of the swing arm 132. The swing arm 132 does not pivot past the first or second latch portions 221 and 222 of the swing arm 132. In addition, the first end portion 211 of the latch lever 210 may be formed to have a hook shape in order to more securely engage with the first latch portion 221.

As described above, the actuator latch system 200, having a single latch lever 210, handles both clockwise and counterclockwise rotational shocks applied to the disk drive.

In addition, the actuator latch system 200 may further include a crash stop 225 to limit the clockwise rotation of the swing arm 132. The crash stop 225 may be installed at the base member 110 to project a predetermined height or distance from the base member 110, and, when the actuator 130 is parked at a parking position, the crash stop 225 is in contact with one side surface of the rear end portion of the swing arm 132.

In addition, the magnetic latch device of the actuator latch system 200 includes at least one projection 234 formed to project from an edge of the magnets 138, and a latch pin 224 is provided at an end portion of the swing arm 132.

The projection 234 is preferably formed to project from the edge of the magnet 138 disposed above the VCM coil 136. The projection 234 is preferably a semicircle shape; however, the projection is not limited to a semicircle shape. In addition, the projection 234 may be disposed at a position corresponding to an approximately middle or center portion of the rear end portion of the swing arm 132, i.e., a position near the first latch portion 221.

The latch pin 224 is made of a magnetic material so that a magnetic force can act between the latch pin 224 and the projection 234 of the magnet 138. Preferably, the latch pin 224 is made of steel that is a ferromagnetic material. In addition, the latch pin 224 may be installed at a position located the closest to the projection 234 when the actuator 130 is parked at the parking position, i.e., the upper surface of the first latch portion 221.

In the magnetic latch device having the above structure, the distance between the latch pin 224 and the projection 234 is the shortest when the actuator 130 is parked at the parking position, and when the swing arm 132 is not in the parking position and is rotating, the distance between the latch pin 224 and the projection 234 increases. At this time, the latch pin 224 is attracted by the magnetic force of the projection 234, and, accordingly, the swing arm 132 is restored to its original position, i.e., the parking position. Therefore, the actuator 130 is not rotated by a rotational shock that is weaker than the magnetic force acting between the latch pin 224 and the projection 234, and the actuator can be maintained in the parked state.

As described above, the actuator latch system 200 withstands a relatively weak shock or weak vibration by having the magnetic latch device. In addition, a lever pin 214 made of a magnetic material may be provided at the latch lever 210 so that the magnetic force of the projection 234 can act on the lever pin 214. The lever pin 214 may be made of steel that is a ferromagnetic material the same as the latch pin 224. In addition, the lever pin 214 may be installed at a position closest to the projection 234 in the vicinity of the pivot shaft 213 of the latch lever 210. Preferably, when the actuator 130 is parked at the parking position, the projection 234, the latch pin 224, and the lever pin 214 are arranged in a straight line.

With the above described structure, the magnetic force of the magnet 138 acts on the lever pin 214, and, accordingly, when the actuator 130 is maintained in the parked state or during normal operation, the latch lever 210 can be restored to a state in which the first end portion 211 and the second end portion 212 are not engaged with the first latch portion 221 and the second latch portion 222.

In addition, the actuator latch system 200 may further include a latch stop 215 for limiting clockwise pivoting of the latch lever 210. The latch stop 215 may be formed to project from a side surface of the latch lever 210 in the vicinity of the pivot shaft 213. When the latch lever 210 pivots clockwise by a predetermined angle, the latch stop 215 comes in contact with a side wall of the base member 110, and therefore the clockwise pivoting of the latch lever 210 is limited thereby.

Figure 9:
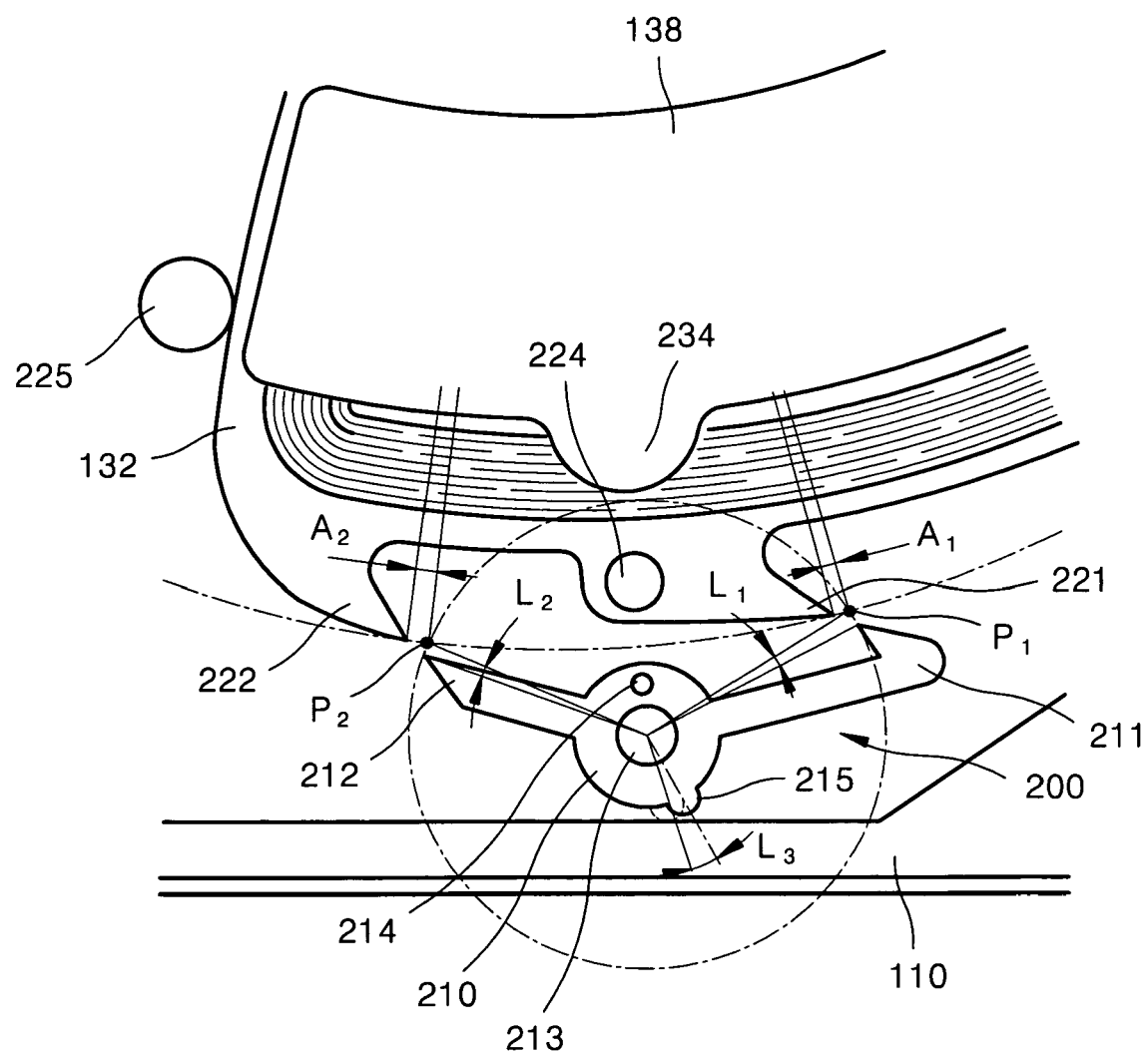
FIG. 9 is a detailed plan view for describing operational conditions of the actuator latch system of FIG. 7.

FIG. 9 is a detailed plan view for describing operational conditions of the actuator latch system of FIG. 7. Referring to FIG. 9, the magnetic latch device of the actuator latch system 200, i.e., the projection 234 and the latch pin 224, functions against a relatively weak rotational shock and weak vibration. That is, the magnetic latch device compensates the inertial latch device because the inertial latch device cannot delicately function against a relatively weak rotational shock and a weak vibration. The magnetic force acting between the projection 234 and the latch pin 224 preferably has a magnitude large enough to handle a range of rotational shocks that the inertial latch means cannot handle. However, the magnetic force acting between the projection 234 and the latch pin 224 must also have a sufficient magnitude not to prevent the swing arm 132 from being normally rotated by the voice coil motor.

Equation 1 must be satisfied in order for the inertial latch device to operate normally. In Equation 1, $T_L$ is a torque produced by the lever pin 214, $T_A$ is a torque produced by the latch pin 224, $I_L$ is a mass moment of inertia of the latch lever 210, and $I_A$ is a mass moment of inertia of the swing arm 132.

$$T_L/I_L < T_A/I_A \qquad \text{Equation 1}$$

In Equation 1, the ratio of the torque $T_A$ to the mass moment $I_A$ acting on the swing arm 132 must be greater than the ratio of those acting on the latch lever 210. When a rotational shock is applied to the disk drive, a precise locking of the actuator 130 is achieved such that the latch lever 210 pivots more easily than the swing arm 132.

In order that the inertial latch device to precisely operate, the following conditions must be satisfied. In FIG. 9, $P_1$ indicates a point on which the first end portion 211 of the latch lever 210 and the first latch portion 221 of the swing arm 132 meet or contact each other. $P_2$ indicates a point that the second end portion 212 of the latch lever 210 and the second latch portion 222 of the swing arm 132 meet or contact each other. $A_1$ is a gap angle between the first latch portion 221 and the point $P_1$. $A_2$ is a gap angle between the second latch portion 222 and the point $P_2$. $L_1$ is a gap angle between the first end portion 211 and the point $P_1$. $L_2$ is a gap angle between the second end portion 212 and the point $P_2$. $L_3$ is an operation angle of the latch stop 215.

$A_1$ must be greater than $L_1$. When the latch lever 210 and the swing arm 132 pivot counterclockwise due to an external shock, the first end portion 211 of the latch lever 210 must reach the point $P_1$ before the first latch portion 221 of the swing arm 132 reaches the point $P_1$.

$A_2$ must be greater than $L_2$. When the latch lever 210 pivots clockwise, and the swing arm 132 rebounds from the crash stop 225 and pivots counterclockwise due to an external shock, the second end portion 212 of the latch lever 210 must reach the point $P_2$ before than the second latch portion 222 of the swing arm 132 reaches the point $P_2$.

$L_3$ must be greater than $L_2$. When the latch lever 210 pivots clockwise due to an external shock, the second end portion 212 of the latch lever 210 must reach the point $P_2$, and thereafter the latch stop 215 meets or comes in contact with the side wall of the base member 110.

The operation of the actuator latch system having the structure shown in FIG. 9 is described with reference to FIGS. 10 and 11. When the disk 120 stops rotating, the actuator 130 is parked at the parking position. Even when a relative weak rotational shock is applied to the disk drive, or the disk drive suffers a weak vibration, the swing arm 132 is stably maintained at the parking position due to the magnetic force acting between the projection 234 and the latch pin 224, and the latch lever 210 is maintained in an unlocked state due to the magnetic force acting between the projection 234 and the lever pin 214, as shown in FIG. 7.

Figure 10:
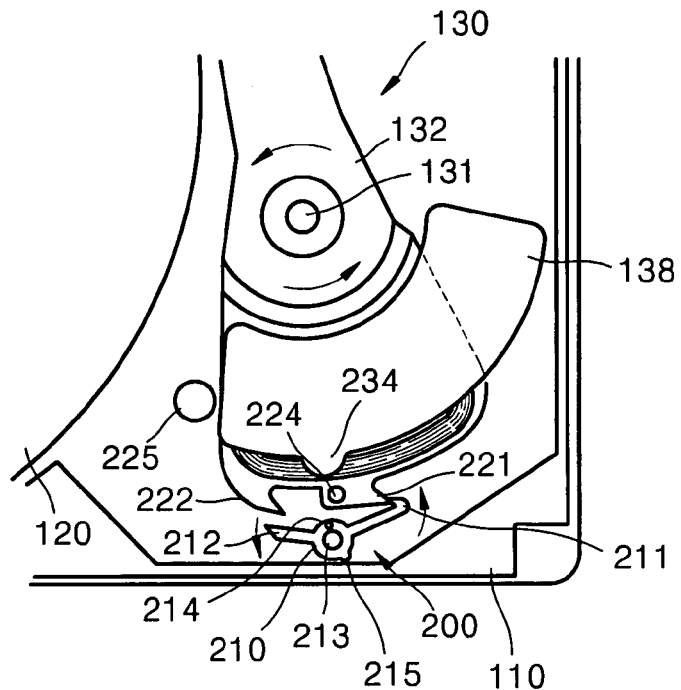
FIG. 10 is a diagram of the actuator latch system according to the present invention when a clockwise rotational shock is applied to the disk drive.

When a relatively strong clockwise rotational shock that is greater than the magnetic force between the projection 234 and the latch pin 224 is applied to the disk drive, the swing arm 132 and the latch lever 210 pivot counterclockwise due to the inertia thereof, as shown in FIG. 10. Since, as described above, the first end portion 211 of the latch lever 210 reaches the point $P_1$ before the first latch portion 221 of the swing arm reaches the point $P_1$, the first latch portion 221 of the swing arm 132 engages with the first end portion 211, and accordingly, the swing arm 132 cannot pivot any further.

Figure 11:
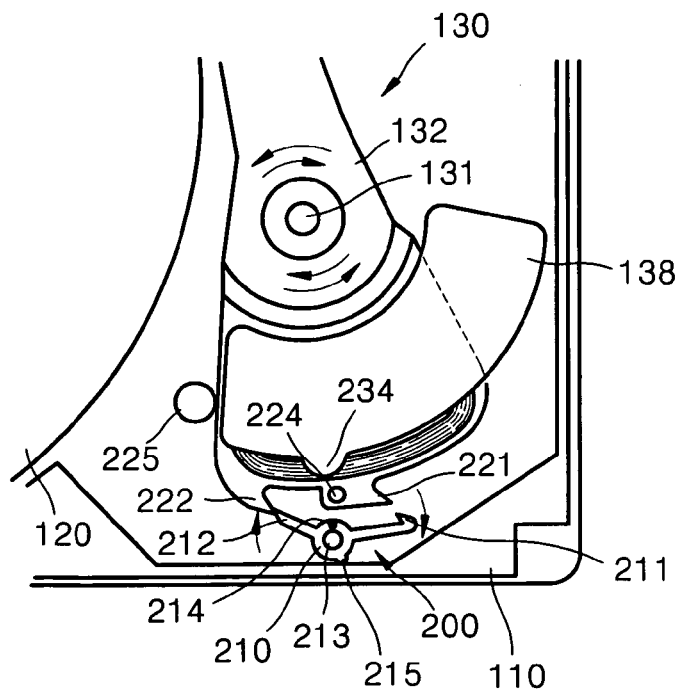
FIG. 11 is a diagram of the actuator latch system according to the present invention when a counterclockwise rotational shock is applied to the disk drive.

When a relatively strong counterclockwise rotational shock beyond the magnetic force between the projection 234 and the latch pin 224 is applied to the disk drive, the latch lever 210 pivots clockwise due to the inertia thereof, and the swing arm 132 rebounds from the crash stop 225 and pivots counterclockwise, as shown in FIG. 11. At this time, since, as described above, the second end portion 212 of the latch lever 210 reaches the point $P_2$ before the second latch portion 222 of the swing arm 132 reaches the point $P_2$, the second latch portion 222 of the swing arm 132 engages with the second end portion 212, and accordingly, the swing arm 132 cannot pivot any further.

As described above, since the actuator latch system of a disk drive reliably functions with the one latch lever operating due to the inertial forces thereof and the latch device operates due to the magnetic force not only when clockwise and counterclockwise rotational shocks are applied to the disk drive but also when a relatively weak rotational shock and weak vibration are applied to the disk drive, stable locking of the actuator is accomplished.

In addition, since the actuator latch system includes the one latch lever and the latch device having a simple structure, the whole structure of the design of the actuator latch system is not complicated, the actuator latch system occupies a smaller space, manufacturing costs are reduced, and the actuator latch system may be easily applied to a compact mobile disk drive.

While this invention has been particularly shown and described with reference to embodiments thereof, it will be understood by those skilled in the art that various changes in form and details may be made therein without departing from the spirit and scope of the invention. For example, even though the latch system according to the present invention is described and shown with reference to an embodiment applied to a ramp loading type disk drive, the latch system can be applied to a CCS type disk drive, as described above.

What is claimed is:

1. An actuator latch system of a disk drive to lock an actuator having a rotatable swing arm installed at a base member, a voice coil motor coil joined to an end portion of the rotatable swing arm, and a magnet disposed to face the voice coil motor coil, comprising:
    a first latch portion and a second latch portion provided at the end portion of the swing arm;
    a latch lever provided at the base member, the latch lever having a first end portion engaged with the first latch portion when the latch lever pivots a first direction, and a second end portion engaged with the second latch portion when the latch lever pivots a second direction;
    a projection formed to project from an edge of the magnet;
    a latch pin provided at an end portion of the swing arm and made of a magnetic material so that a magnetic force operates between the latch pin and the projection; and
    a lever pin made of a magnetic material that is provided at the latch lever,
    wherein the first end portion and the second end portion of the latch lever are not engaged with the first latch portion and the second latch portion due to the magnetic force operating between the lever pin and the projection.

2. The actuator latch system of the disk drive as claimed in claim 1, wherein the first and the second latch portions are spaced a predetermined distance from each other and formed to horizontally project from the end portion of the swing arm, respectively.

3. The actuator latch system of the disk drive as claimed in claim 1, further comprising a crash stop to limit a directional rotation of the swing arm.

4. The actuator latch system of the disk drive as claimed in claim 1, wherein the latch pin is provided at a position nearest to the projection when the actuator is parked at a parking position.

5. The actuator latch system of the disk drive as claimed in claim 1, wherein the projection is a semicircle shape.

6. The actuator latch system of the disk drive as claimed in claim 1, wherein the latch pin is provided at an upper surface of the first latch portion.

7. The actuator latch system of the disk drive as claimed in claim 1, wherein the latch pin is a steel material.

8. The actuator latch system of the disk drive as claimed in claim 1, wherein the latch lever is a nonmagnetic material.

9. The actuator latch system of the disk drive as claimed in claim 8, wherein the latch lever is a polymer material made by a plastic injection molding procedure.

10. The actuator latch system of the disk drive as claimed in claim 1, wherein the first end portion of the latch lever is a hook shape.

11. The actuator latch system of the disk drive as claimed in claim 1, wherein the lever pin is a steel material.

12. The actuator latch system of the disk drive as claimed in claim 1, wherein the lever pin is provided at a position that is nearest to the projection in the area of the pivoting center of the latch lever.

13. The actuator latch system of the disk drive as claimed in claim 1, wherein the projection, the latch pin, and the lever pin are arranged in a straight line when the actuator is parked at a parking position.

14. An actuator latch system of a disk drive to lock an actuator having a rotatable swing arm installed at a base member, a voice coil motor coil joined to an end portion of the rotatable swing arm, and a magnet disposed to face the voice coil motor coil, comprising:
    a first latch portion and a second latch portion provided at the end portion of the swing arm;
    a latch lever provided at the base member, the latch lever having a first end portion engaged with the first latch portion when the latch lever pivots a first direction, and a second end portion engaged with the second latch portion when the latch lever pivots a second direction;
    a projection formed to project from an edge of the magnet;
    a latch pin provided at an end portion of the swing arm and made of a magnetic material so that a magnetic force operates between the latch pin and the projection; and
    a latch stop to limit a directional pivot of the latch lever.

15. The actuator latch system of the disk drive as claimed in claim 14, wherein the latch stop projects from a side surface of the latch lever in the area of the pivoting center of the latch lever, and contacts a side wall of the base member when the latch lever pivots at a predetermined angle.

16. An actuator latch system of a disk drive to lock an actuator having a rotatable swing arm installed at a base member, a voice coil motor coil joined to an end portion of the rotatable swing arm, and a magnet disposed to face the voice coil motor coil, comprising:
a first latch portion and a second latch portion provided at the end portion of the swing arm;
a latch lever provided at the base member, the latch lever having a first end portion engaged with the first latch portion when the latch lever pivots a first direction, and a second end portion engaged with the second latch portion when the latch lever pivots a second direction;
a projection formed to project from an edge of the magnet; and
a latch pin provided at an end portion of the swing arm and made of a magnetic material so that a magnetic force operates between the latch pin and the projection, wherein a ratio of a torque produced by the latch pin to a mass moment of inertial of the swing arm is greater than a ratio of a torque produced by the latch lever pin to a mass moment of inertial of the latch lever, such that less force is required for rotation of the latch lever than is required for the rotation of the swing arm.

17. The actuator latch system of the disk drive as claimed in claim 1, wherein a gap angle between the first latch portion and a point where the first end portion and the first latch portion meet is greater than a gap angle between the first end portion and the point where the first end portion and the first latch portion meet, such that when the latch lever and the swing arm pivot in a same rotational direction, the first end portion reaches the point where the first end portion and the first latch portion meet before the first latch portion reaches such point.

18. The actuator latch system of the disk drive as claimed in claim 17, wherein a gap angle between the second latch portion and a point where the second end portion and the second latch portion meet is greater than a gap angle between the second end portion and the point where the second end portion and the second latch portion meet, such that when the latch lever pivots in a first rotational direction and the swing arm pivots in an opposite rotational direction, the second end portion reaches the point where the second end portion and the second latch portion meet before the second latch portion reaches such point.

19. The actuator latch system of the disk drive as claimed in claim 14, wherein an operation angle of the latch stop is greater than the gap angle between the second end portion and the point where the second end portion and the second latch portion meet, such that when the latch lever pivots, the second end portion reaches the point where the second end portion and the second latch portion meet, thereby enabling the latch stop to contact the side wall of the base member of the disk drive.

20. The actuator latch system of the disk drive as claimed in claim 1, wherein a single latch lever enables both an inertial latching function and a magnetic latching function to latch the actuator arm of the disk drive.

21. A method of latching an actuator arm of a disk drive at a predetermined position when a disk stops rotating to prevent the actuator arm from rotating, the actuator arm having a swing arm installed at a base member of the disk drive, a voice coil motor coil joined to an end portion of the swing arm, and a magnet disposed to face the voice coil motor coil, the method comprising:
magnetically latching a latch pin provided on the swing arm with a portion of the magnet, such that a magnetic force acts between the latch pin and the magnet to maintain the actuator arm at the predetermined position;
latching a first latch portion and a second latch portion of the swing arm with a first end portion and a second end portion of a latch lever, respectively, such that the engaging is performed according to a rotational pivot direction of the latch lever; and
locating the latch pin at a position nearest to the magnet when the actuator arm is parked at a parking position, wherein when a rotational shock is applied to the disk drive that is greater than the magnetic force, the first latch portion and the second latch portion latch with the first end portion and the second end portion, respectively, depending on a rotational direction of the shock.

22. The method of latching the actuator arm of the disk drive as claimed in claim 21, wherein the magnetic attraction functions against a weaker rotational shock than the inertial latching is capable of functioning against, such that the magnetic attraction functions against a range of rotational shocks that the inertial latch is unable to handle.

23. The method of latching the actuator arm of the disk drive as claimed in claim 21, wherein the magnetic attraction provides a sufficient attraction not to prevent the swing arm from being normally rotated by the voice coil motor.

24. The method of latching the actuator arm of the disk drive as claimed in claim 23, further comprising, in order for the inertial latching to function properly, setting a ratio of a torque produced by the latch pin to a mass moment of inertial of the swing arm to be greater than a ratio of a torque produced by a latch lever pin to a mass moment of inertial of the latch lever, such that less force is required for rotation of the latch lever than is required for the rotation of the swing arm.

25. The method of latching the actuator arm of the disk drive as claimed in claim 24, further comprising setting a gap angle between the first latch portion of the swing arm and a point where the first end portion and the first latch portion meet to be greater than a gap angle between the first end portion and the point where the first end portion and the first latch portion meet, such that when the latch lever and the swing arm pivot in a first rotational direction, the first end portion reaches the point where the first end portion and the first latch portion meet before the first latch portion reaches such point.

26. The method of latching the actuator arm of the disk drive as claimed in claim 25, further comprising setting a gap angle between the second latch portion and a point where the second end portion and the second latch portion meet to be greater than a gap angle between the second end portion and the point where the second end portion and the second latch portion meet, such that when the latch lever pivots in a second rotational direction and the swing arm pivots in a first rotational direction, the second end portion reaches the point where the second end portion and the second latch portion meet before the second latch portion reaches such point.

27. The method of latching the actuator arm of the disk drive as claimed in claim 26, further comprising setting an operation angle of a latch stop to be greater than the gap angle between the second end portion and the point where the second end portion and the second latch portion meet, such that when the latch lever pivots in a second rotational direction, the second end portion reaches the point where the second end portion and the second latch portion meet, thereby enabling the latch stop to contact the side wall of the base member of the disk drive.

28. The method of latching the actuator arm of the disk drive as claimed in claim 27, wherein the first rotational direction is a counterclockwise direction and the second rotational direction is a clockwise direction.

29. The method of latching the actuator arm of the disk drive as claimed in claim 21, further comprising limiting a rotation of the swing arm by including a crash stop device.

30. The method of latching the actuator arm of the disk drive as claimed in claim 29, wherein when a shock is applied to the disk drive in a second rotational direction that is greater than the magnetic attraction of the magnet and the latch pin, the swing arm and the latch lever pivot in a first rotational direction, resulting in the first end portion reaching a point where the first end portion and the first latch portion meet prior to the first latch portion reaching such point, such that the first latch portion engages with the first end portion, thereby preventing the swing arm from pivoting any further in the first rotational direction.

31. The method of latching the actuator arm of the disk drive as claimed in claim 30, wherein when a shock is applied to the disk drive in the first rotational direction that is greater than the magnetic attraction of the magnet and the latch pin, the latch lever pivots in the second rotational direction and the swing arm pivots in the first rotational direction after rebounding from the crash stop, resulting in the second latch portion reaching a point where the second end portion and the second latch portion meet prior to the second latch portion reaching such point, such that the second latch portion engages with the second end portion, thereby preventing the swing arm from pivoting any further in the second rotational direction.

32. The method of latching the actuator arm of the disk drive as claimed in claim 31, wherein the first rotational direction is a counterclockwise direction and the second rotational direction is a clockwise direction.

33. The method of latching the actuator arm of the disk drive as claimed in claim 21, further comprising spacing the first and the second latch portions a predetermined distance apart from each other, wherein the first and the second latch portions project from the end portion of the swing arm, respectively.

34. The method of latching the actuator arm of the disk drive as claimed in claim 21, wherein the actuator latch system performs the magnetic latching and inertial latching functions with a single latch lever.

35. An actuator latch system of a disk drive that is capable of locking an actuator arm at a predetermined position when a disk stops rotating, the actuator arm having a read/write head attached thereto, a swing arm, a voice coil motor coil joined to one end portion of the rotatable swing arm, and a magnet disposed to face the voice coil motor coil, comprising:

an inertial latch to prevent the actuator arm from moving from a predetermined location by latching together portions of a swing arm with portions of a latch lever; and a magnetic latch to provide a magnetic force to prevent the actuator arm from moving from the predetermined location, the magnetic latch comprises:

a projection formed to project from an edge of the magnet, and a magnetic latch pin provided on the swing arm so that the magnetic force acts between the latch pin and the projection, wherein when a rotational shock applied to the disk drive is greater than the magnetic force, the inertial latch functions such that portions of the swing arm latch with portions of the latch lever, and a ratio of a torque produced by the latch pin to a mass moment of inertial of the swing arm is greater than a ratio of a torque produced by the latch lever pin to a mass moment of inertial of the latch lever, such that less force is required for rotation of the latch lever than is required for the rotation of the swing arm.

36. The actuator latch system of the disk drive as claimed in claim 35, wherein the inertial latch further comprises:

a first and a second latch portion provided at an end portion of the swing arm; and a latch lever having a first end portion engaged with the first latch portion when the latch lever pivots in a first rotational direction, and a second end portion engaged with the second latch portion when the latch lever pivots in a second rotational direction.

37. The actuator latch system of the disk drive as claimed in claim 36, wherein a gap angle between the first latch portion and a point where the first end portion and the first latch portion meet is greater than a gap angle between the first end portion and the point where the first end portion and the first latch portion meet, such that when the latch lever and the swing arm pivot in a first rotational direction, the first end portion reaches the point where the first end portion and the first latch portion meet before the first latch portion reaches such point.

38. The actuator latch system of the disk drive as claimed in claim 37, wherein a gap angle between the second latch portion and a point where the second end portion and the second latch portion meet is greater than a gap angle between the second end portion and the point where the second end portion and the second latch portion meet, such that when the latch lever pivots in a second rotational direction and the swing arm pivots in the first rotational direction, the second end portion reaches the point where the second end portion and the second latch portion meet before the second latch portion reaches such point.

39. An actuator latch system of a disk drive that is capable of locking an actuator arm at a predetermined position when a disk stops rotating, the actuator arm having a read/write head attached thereto, a swing arm, a voice coil motor coil joined to one end portion of the rotatable swing arm, and a magnet disposed to face the voice coil motor coil, comprising:

an inertial latch to prevent the actuator arm from moving from a predetermined location by latching together portions of a swing arm with portions of a latch lever; and a magnetic latch to provide a magnetic force to prevent the actuator arm from moving from the predetermined location, the magnetic latch comprising a projection formed to project from an edge of the magnet, and a magnetic latch pin provided on the swing arm so that the magnetic force acts between the latch pin and the projection; and a latch stop to limit a pivot of the latch lever, wherein the inertial latch comprises a first and a second latch portion provided at an end portion of the swing arm and a latch lever having a first end portion engaged with the first latch portion when the latch lever pivots in a first rotational direction, and a second end portion engaged with the second latch portion when the latch lever pivots in a second rotational direction.

40. The actuator latch system of the disk drive as claimed in claim 38, wherein a latch stop is formed to project from a side surface of the latch lever in the vicinity of the pivoting center of the latch lever, and contact a side wall of the base member when the latch lever pivots by a predetermined angle.

41. The actuator latch system of the disk drive as claimed in claim 39, wherein an operation angle of the latch stop is greater than the gap angle between the second end portion and the point where the second end portion and the second latch portion meet, such that when the latch lever pivots in a second rotational direction due to an external shock, the second end portion reaches the point where the second end portion and the second latch portion meet, thereby enabling the latch stop to contact the side wall of the base member of the disk drive.

42. The actuator latch system of the disk drive as claimed in claim 41, wherein the first rotational direction is a counterclockwise direction and the second rotational direction is a clockwise direction.

43. The actuator latch system of the disk drive as claimed in claim 35, wherein a single latch lever enables both an inertial latching function and a magnetic latching function to latch the actuator arm of the disk drive.

* * * * *